United States Patent
Kandru et al.

(10) Patent No.: US 10,353,804 B1
(45) Date of Patent: Jul. 16, 2019

(54) PERFORMANCE ENGINEERING PLATFORM AND METRIC MANAGEMENT

(71) Applicant: Capital One Services, LLC, McLean, VA (US)

(72) Inventors: Sashi Kandru, McLean, VA (US); Navin Yadav, McLean, VA (US); Joshua McNeil, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/254,454

(22) Filed: Jan. 22, 2019

(51) Int. Cl.
G06F 9/44 (2018.01)
G06F 11/36 (2006.01)
G06F 9/451 (2018.01)

(52) U.S. Cl.
CPC .......... *G06F 11/3664* (2013.01); *G06F 9/451* (2018.02); *G06F 11/3616* (2013.01); *G06F 11/3688* (2013.01)

(58) Field of Classification Search
CPC .. G06F 11/3664; G06F 11/3616; G06F 9/451; G06F 11/3688
See application file for complete search history.

(56) References Cited

U.S. PATENT DOCUMENTS

| | | | | |
|---|---|---|---|---|
| 6,981,180 B1 * | 12/2005 | Bailey | .................. | H04L 41/145 714/38.11 |
| 7,359,820 B1 * | 4/2008 | Browne | .............. | G06F 11/3688 702/108 |
| 7,539,489 B1 * | 5/2009 | Alexander | ............ | H04W 24/06 370/241 |
| 7,559,001 B2 * | 7/2009 | Betawar | ................ | G06F 11/263 375/224 |
| 8,743,735 B1 * | 6/2014 | Bershteyn | ............... | H04L 43/50 370/254 |
| 8,826,084 B1 * | 9/2014 | Gauf | .................... | G06F 11/3688 714/32 |
| 9,116,873 B2 * | 8/2015 | Majumdar | .......... | G06F 11/3433 |
| 9,824,001 B2 | 11/2017 | Bhattacharya | | |
| 2006/0271322 A1 * | 11/2006 | Haggerty | ............ | G06F 11/2273 702/108 |
| 2007/0162894 A1 * | 7/2007 | Noller | ................. | G06F 11/3684 717/124 |
| 2009/0271662 A1 | 10/2009 | Tarta | | |

(Continued)

*Primary Examiner* — Adam Lee (57) ABSTRACT

A flexible, adaptive performance test platform allows a test developer to customize performance tests to more realistically determine the impact of network behavior on a system under test. The test platform may be accessed through the use of a Graphic User Interface (GUI) by all developers within an enterprise to generate and execute performance tests prior to release of new systems by the enterprise. In one aspect, the test platform enables developers to share performance tests, thereby leveraging existing work product to reduce the overall system development time. In another aspect, the test platform enables developers to customize performance tests, providing the flexibility to easily specify a duration, scale, geography and/or resource for the test. In another aspect, the test platform enables developers to customize and monitor one or more metrics in accordance with the particular performance goals of the SUT, to enable a developer to more easily identify system issues.

20 Claims, 9 Drawing Sheets

(56) References Cited

U.S. PATENT DOCUMENTS

| | | | |
|---|---|---|---|
| 2010/0095167 A1* | 4/2010 | Kotrla | H04L 43/0847 714/705 |
| 2013/0311977 A1* | 11/2013 | Nieminen | G06F 11/3672 717/135 |
| 2013/0318291 A1* | 11/2013 | Pepper | H04L 43/10 711/105 |
| 2014/0129878 A1* | 5/2014 | Saltzman | H04L 67/2804 714/38.1 |
| 2014/0160961 A1* | 6/2014 | Dragulescu | H04L 43/0894 370/252 |
| 2014/0250328 A1* | 9/2014 | Schnizler | G06F 11/2733 714/31 |
| 2014/0254647 A1* | 9/2014 | Stott | H04L 43/50 375/224 |
| 2014/0258781 A1* | 9/2014 | Cook | G06F 11/263 714/32 |
| 2015/0051872 A1* | 2/2015 | Arora | G06F 11/3428 702/186 |
| 2015/0180743 A1* | 6/2015 | Jana | H04L 43/045 715/736 |
| 2015/0286552 A1* | 10/2015 | Michelsen | G06F 11/3684 714/38.1 |
| 2017/0060720 A1* | 3/2017 | Ramanath | H04L 43/50 |
| 2017/0180233 A1* | 6/2017 | Nistor | H04L 41/12 |
| 2017/0272352 A1* | 9/2017 | Badea | H04L 43/50 |
| 2017/0295084 A1* | 10/2017 | Ramanath | H04L 43/50 |
| 2017/0344467 A1* | 11/2017 | Yadav | G06F 11/3684 |
| 2018/0049052 A1* | 2/2018 | Doshi | H04W 24/06 |
| 2018/0150371 A1* | 5/2018 | Gintis | G06F 11/263 |
| 2018/0217923 A1* | 8/2018 | Rossler | G06F 11/3692 |
| 2018/0287906 A1* | 10/2018 | Clements | H04L 67/303 |
| 2018/0293157 A1* | 10/2018 | Dougherty | G06F 11/3684 |
| 2018/0375751 A1* | 12/2018 | Lee | H04L 43/0829 |

* cited by examiner

CREATE TEST

⚙ TEST PLAN SETUP

| TEST TYPE* | APPLICATION | TEST NAME* | VIRTUAL USER* | RAMPUP TIME* | DURATION* | RAMPDOWN TIME* |
|---|---|---|---|---|---|---|
| LOAD ◆ | BAP/APP ◆ | | | IN SECONDS | IN SECONDS | IN SECONDS |
| 431 | 432 | 433 | 434 | 435 | 436 | 437 |

+ ADD REQUEST — 438

440

□ TRAINING   # SLACKSUPPORT   @ GITHUB LINKS   ╪ DOE, JOHN

450

NAME
⌂ HOME
☞ CREATE NEW TEST
☞ ADD TEST
▲ START TEST
● VIEW
  ALL RUNS
  ALL TESTS
  ALL STUBS
  ALL BAPS
⊙ NEED HELP?

RUNNING A TEST

TO RUN A TEST, SIMPLY CLICK ON THE GREEN PLAY BUTTON FOR THE SPECIFIED TEST

YOUR TESTS

[ SEARCH TESTS 🔍 ]   [ ADD TEST ]

| TEST NAME | BAP | GIT REPO | FILE NAME | NO. OF AGENTS | Rs. TIME(msec) TARGET | TPS TARGET | ERROR % THRESHOLD | DATE CREATED | ACTION |
|---|---|---|---|---|---|---|---|---|---|
| FOURTHTESTBYMICHELLE | C1387639 | dummyRepoForTest | test1.jmx | 1 | 1 | 1 | 1 | 04/04/2018 @ 1:28PM | △ |
| TEST3MICHELLE | C1387639 | dummyRepoForTest | test2.jmx | 1 | 1 | 1 | 1 | 03/27/2018 @ 4:18PM | △ |
| SECONDTESTFORMICHELLE | C1387639 | dummyRepoForTest | | 1 | 1 | 1 | 1 | 03/16/2018 @ 11:59AM | △ |
| MICHELLE-TEST | C1387639 | dummyRepoForTest | | 1 | 1 | 1 | 1 | 03/15/2018 @ 3:31PM | △ |

FIG. 8 ced or both. Performance test may be used to determine how the system under test will perform under a particular collection of workloads. Workload simulation forms an integral part of performance test. In workload simulation, different workloads are generated and subjected upon a system under test, in order to simulate the conditions under which the computing system will operate.

PERFORMANCE ENGINEERING PLATFORM AND METRIC MANAGEMENT

BACKGROUND

Almost all modern service providers use the internet to provide service offerings to potential consumers. The service offerings are generally provided in the form of software applications which operate using dedicated resources of the service provider. Together, the applications and the resources dedicated to the applications form a system within the service provider infrastructure that supports the service offering.

To maintain goodwill, it is desirable that any system that is released by a service provider be free from defects which may create delays, corrupt customer data or otherwise adversely affect system performance. System problems, such as those caused by poor application performance or resource deficiencies may reduce customer confidence, degrade service provider goodwill and potentially result in loss of sales. Accordingly, before any system is released, it is important to test the operation of the system in the environment in which it ultimately will be utilized.

Performance test tools are commercially available that can be used to identify issues with software and hardware prior to the general release. Performance test tools simulate real-time workloads to "exercise" the system under test under virtual real-world conditions. Performance test tools can include software running on the system under test, software running on a remote computer that manages computer tests to interact with the system under test, or both. Performance test may be used to determine how the system under test will perform under a particular collection of workloads. Workload simulation forms an integral part of performance test. In workload simulation, different workloads are generated and subjected upon a system under test, in order to simulate the conditions under which the computing system will operate.

One challenge that is faced by performance tests is the increasing diversity and complexity of the network environment used by consumers. Systems must be able to interact both with consumers and with systems hosted by other service providers, over a variety of geographically diverse networks, using computers operating under a variety of different operating systems. It is difficult for existing performance test tools to keep pace with the dynamic network environment in which a system may be deployed.

SUMMARY

According to one aspect of the invention, a performance test system for testing a system under test (SUT) includes a test platform to generate, execute, track or analyze a test. A workstation, coupled to the test platform, includes a graphic user interface (GUI) comprising a plurality of inputs for forwarding information to the test platform to control at least one of a selection, definition, execution, tracking or analysis of the test. At least one agent is deployed in response to the plurality of inputs received from the GUI, the agent for generating network traffic to test the SUT. A storage device, coupled to the test platform, stores resulting network traffic comprising test results, and a metrics analysis unit, coupled to the storage device, for processing the test results to generate performance metric results for the SUT, the performance metric results including custom metrics defined at the GUI, wherein the GUI includes a dynamically updated run window that reports at least a portion of the performance metric results to the test platform.

According to another aspect of the invention, a method for testing a SUT includes the steps of displaying a list of a plurality of tests available to test the SUT to a user at a workstation and receiving control input from the user, the control input including a selected test. In response to the selected test, the method includes the steps of deploying an agent to operate on a pool of one or more servers, the agent executing the selected test by generating network traffic to test the SUT and storing network data received from execution of the selected test. The method includes the step of analyzing the network data to generate performance metrics for the SUT and displaying at least one performance metric the user.

According to a further aspect of the invention, a method for testing an SUT includes the steps of displaying a list of a plurality of tests available to test the SUT to a user at a workstation receiving control input from the user, the control input including a selected test, in response to the selected test, deploying an agent to operate on a pool of one or more servers, the agent executing the selected test by generating network traffic to test the SUT, wherein the pool of one or more servers is geographically distributed, and wherein an agent is assigned to a pool in accordance with a region selected by the user, storing network data received from execution of the selected test, analyzing the network data to generate a performance metric for the SUT, the performance metric selected from a group including response time, transactions per second and error rate threshold and customized by the user, wherein the step of analyzing occurs while the agent is executing the test and displaying the performance metric the user, and selectively terminating the test in response to the performance metric.

DEFINITIONS

As used herein, unless specifically indicated otherwise, the word "or" is used in the inclusive sense of "and/or" and not the exclusive sense of "either/or."

In order for the present invention to be more readily understood, certain terms are first defined below. Additional definitions for the following terms and other terms are set forth throughout the specification.

Agent means software code that is generated by the Test Platform, programmed to perform a specific task and deployed to operate on a resource of a test network.

Component/System/Unit: As used in this application, the terms "component" or "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. A system or a unit may be comprised of a plurality of coupled components. By way of illustration, both an application running on a server and the server can be a component. The application and the resources used to support the application may be referred to as a system.

Enterprise Network means an enterprise's communications backbone that helps connect computers and related devices across departments and workgroup networks, facilitating insight and data accessibility. An enterprise network reduces communication protocols, facilitating system and device interoperability, as well as improved internal and external enterprise data management.

Improve, increase or reduce or grammatical equivalents, indicates values that are relative to a baseline measurement, such as measurements related to machine throughput, performance or efficiency.

Metric means a performance measurement.

System Under Test (SUT) means a system whose operation and performance is evaluated by one or more performance tests.

Test means a collection of instructions that result in the performance of a particular task.

Test Network means any directly or indirectly interconnected set of resources (applications, services, data, computing systems, storage devices) which are available to the test platform for testing the SUT. The resources may comprise any mix of local or geographically distributed resources or cloud-based resources, and the network may include any combination of Local Area Network (LAN), Metropolitan Area Network (MAN) or Wide Area Network (WAN) communication protocols.

Test Platform means a system of the present invention which may be controlled by a Graphic User Interface (GUI) to generate and execute performance tests for a SUT, and to collect information, analyze metrics and display results of the performance tests.

Test Run means a group of tests that may have interdependencies and that are launched together from the test platform.

DETAILED DESCRIPTION

A flexible, adaptive performance test platform allows a test developer to customize performance tests to more realistically determine the impact of network behavior on a system under test. The test platform may be accessed through the use of a Graphic User Interface (GUI) by all developers within an enterprise network to generate and execute performance tests prior to release of new systems by the enterprise. In one aspect, the test platform enables developers to share performance tests, thereby leveraging existing work product to reduce the overall system development time. In another aspect, the test platform enables developers to customize performance tests, providing the flexibility to easily specify a duration, scale, geography and/or resource for the test. In another aspect, the test platform enables developers to customize and monitor one or more metrics in accordance with the particular performance goals of the SUT to enable a developer to more easily identify system issues.

Figure 1:
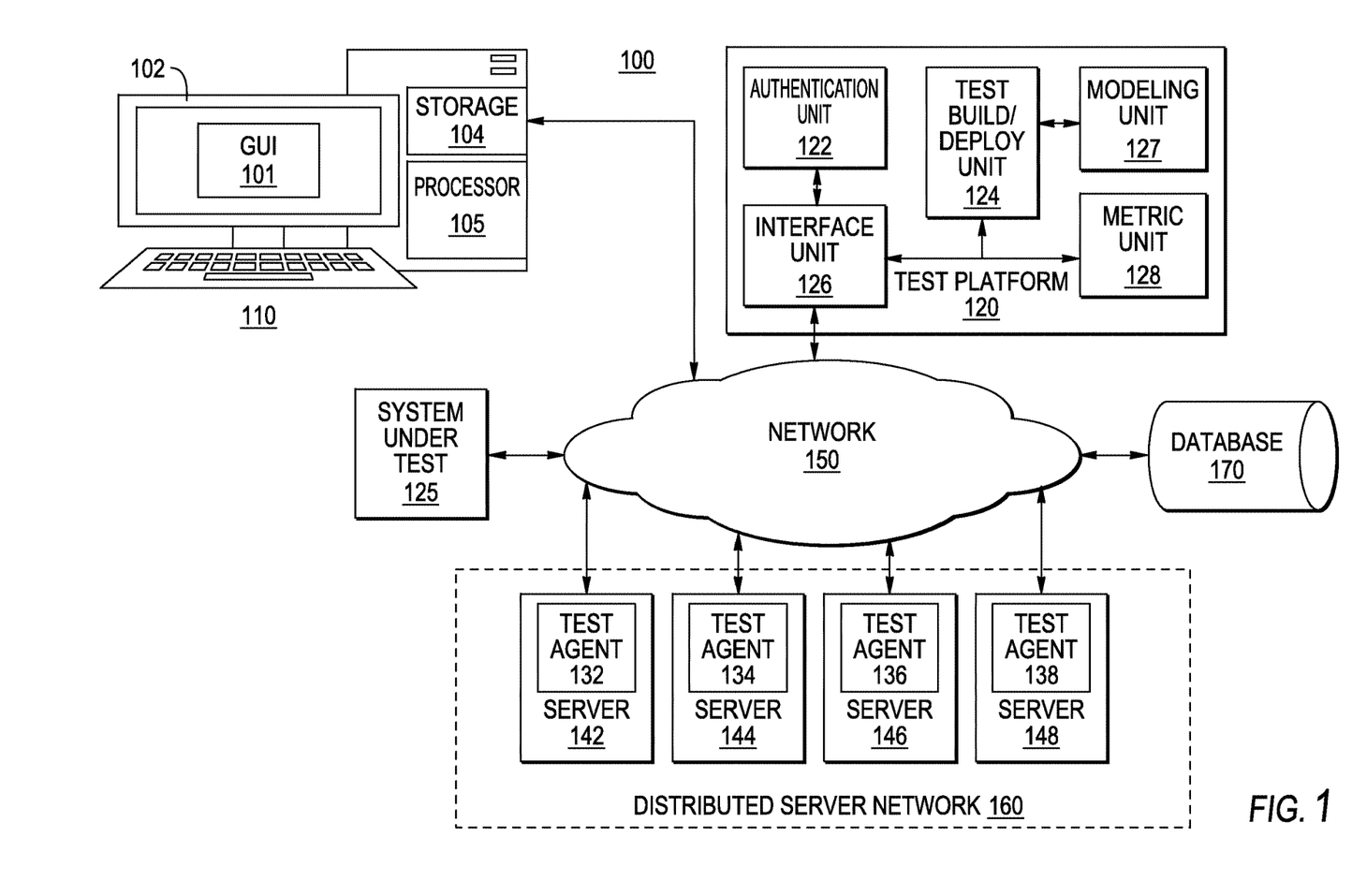
FIG. 1 is a block diagram of one embodiment of a network including a test platform of the invention.

These and other features of the invention will now be described with reference to the attached figures, where like numbers refer to like elements throughout. In one embodiment, a test platform 120, SUT 125, workstation 110, a database 170 and a distributed server network 160 are shown coupled via network 150.

The network 150 may be any one of or the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks. Each of the components shown in FIG. 1 may be coupled together using different resources of network 150. For example, test platform 120 may operate at or within an enterprise network, and be used to test the SUT 125 prior to its formal release. The test platform 120 may be controlled by a coupled developer operating workstation 110. Accordingly, the SUT 125, workstation 110 and test platform may communicate using LAN networks and protocols. The distributed server network 160 includes a plurality of application servers 142, 144, 146 and 148, each of which may be used to generate network traffic to test the SUT 125. Accordingly, each server 142, 144, 146 and 148 may communicate with the SUT 125 and test platform 120 using WAN networks and protocols. As will be described in more detail below, each of the servers may host a test agent (such as test agents 132, 134, 136 and 138), each of which generates network traffic in accordance with an associated test in order to test SUT 125.

The workstation 110 is a computing device comprising a display 102, and a processor 105 (e.g., a central processing unit (CPU), a graphics processing unit (GPU), or both) communicatively coupled to a machine-readable storage device 104 (e.g., read-only memory (ROM), flash memory, dynamic random-access memory (DRAM) such as synchronous DRAM (SDRAM) or Rambus DRAM (RDRAM), etc.). In one aspect, the storage device 104 includes instructions stored thereon which are operable when executed upon by the processor 105 to display a graphic user interface (GUI) 101 to a performance test developer ("developer"). In one aspect, the GUI 101 includes input mechanisms that enable the developer to generate, execute, track and analyze performance tests for a System Under Test (SUT) 125.

It should be noted that although the GUI 101 is described as a display of a workstation, the present invention is not limited to the use of any physical medium providing a display and/or control input. In alternate embodiments, the workstation 110 may be a personal computer (PC), a tablet PC, a Personal Digital Assistant (PDA), a cellular telephone, or any machine capable of displaying controls to a laboratory technician and receiving control from the technician to responsively execute a set of instructions (sequential or otherwise) that specify actions to be taken by the system 100. Further, while only a single workstation 101 is illustrated, the term "workstation" shall also be taken to include any collection of devices that individually or jointly execute a set (or multiple sets) of instructions to perform any one or more of the methodologies discussed herein.

Database 170 comprises data storage resources that may be used, for example, to collect any combination of tests, test result data, test metrics and the like. The database 170 may be comprised of coupled data resources comprising any combination of local storage, distributed data center storage or cloud-based storage.

In one aspect, the test platform 120 comprises a plurality of components that may be used to generate a tests, including an interface unit 126 for communicating with network 150, authentication unit 122 for authorizing users of the test platform 120, a modeling unit 127 for modeling a test environment for deployment of the test, a test build/deploy unit 124 for generating and executing tests, and a metric unit 128 for monitoring execution of the test including collecting running metrics for the test, analyzing test results and metrics and displaying test results.

Each component (122-128) of the test platform performs various tasks in the preparation, execution and analysis of system tests. In one embodiment, the test platform 120 advantageously uses a secure cloud services platform, such as Amazon Web Services (AWS) for compute power, database storage, content delivery and other functionality to assist with performance testing. AWS provides a mix of infrastructure as a service (IaaS), platform as a service (PaaS) and packaged software as a service (SaaS) offerings. AWS provides services from dozens of data centers spread across regions throughout the world. According to one aspect, it is realized that AWS, or similar cloud services platforms can be advantageously leveraged to spin up virtual machines (VMs) and replicate data in different data centers to achieve a robust and scalable testing environment.

Figure 2:
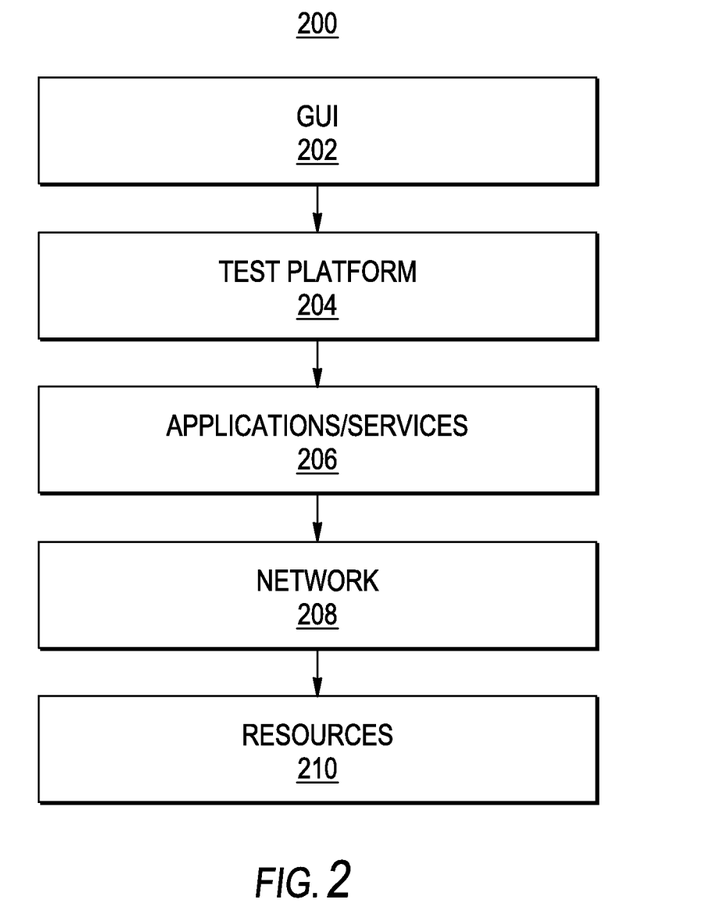
FIG. 2 is a diagram illustrating various layers of an architecture of a test network including the test platform of FIG. 1.

FIG. 2 shows a diagram illustrating the various software layers of a performance test architecture 200 of the present invention. A GUI 202 comprises a thin client that is executed on a developer workstation to provide control mechanisms allowing the developer to control the operation of components of the test platform 204. The test platform 204, during operation and in response to the control input, invokes one or more applications/services 206, which may include one or both of shared, distributed services or dedicated, custom services optimized for and hosted by the test platform. The applications/services in turn access different resources 210 via network 208 during execution of their tasks, where resources include processors, servers, storage devices and network bandwidth.

Figure 3:
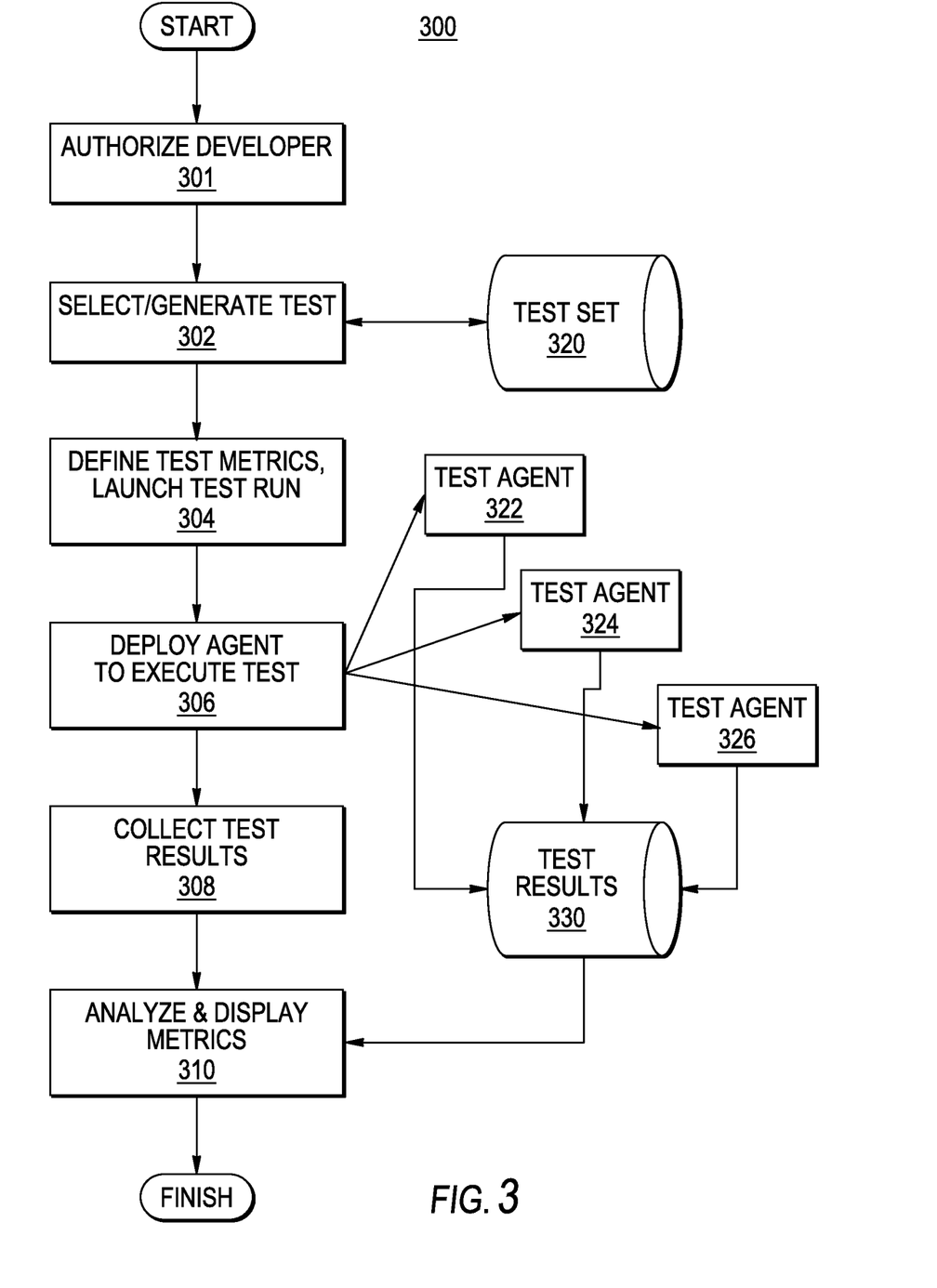
FIG. 3 is a flow diagram illustrating exemplary steps that may be performed to build and deploy performance tests using the test platform of FIG. 1.

FIG. 3 is a flow diagram illustrating exemplary steps that may be performed during a process 300 of test generation, execution, monitoring and analysis by the test platform 204. At step 301, the developer logs into the test platform using an authentication service. The authentication service may include a user/password or key exchange, be a single factor or multi-factor, etc.

At step 302 the developer begins the process of building a test run by creating or selecting one or more tests to be applied to a SUT. For example, the developer may select a test from a set of pre-existing tests ("Test Set 320") for use in a test run. Alternatively, the developer may create a new test, customized for the particular SUT. According to one aspect, each test includes a scaling factor that indicates the number of times that the particular test is replicated (i.e., the number of agents that are deployed for a particular test) throughout the test network for the test run. For example, to test a particular geographical region, a pool of agents may be deployed to resources associated with that region. Each test is configured to generate network traffic for the purposes of exercising functionality of the application and also an application's management and responsiveness to different network traffic patterns and loads.

Once the test run has been populated with tests, at step 304 the desired metrics are determined, where the metrics may include key performance indicators (KPI) such as latency, transactions per second, and acceptable error rate. The developer then launches the test run.

In one embodiment, when the test run is launched, each test is used to populate an application image, which is launched as an agent to run on one or more destination server devices. Each agent executes at the respective server device to provide network traffic to the SUT to test the application. In one embodiment, agents may be geographically deployed; i.e., agents may be deployed to a pool servers in different geographical regions to determine the adequacy of underlying system resources supporting the application within those regions. The collection of agents for each test and/or each test run may be referred to as a cluster of agents. For illustration purposes, it is shown that test agent 322, test agent 324 and test agent 326 are deployed in response to test launch at step 306.

During execution of a test run, at step 308 the test results 330 are collected. In one aspect, during testing the results are analyzed at step 310, and metrics are dynamically calculated during the run. In one embodiment, tests may be terminated in response to a threshold being satisfied, where the threshold may be a key performance indicator threshold, for example, an error rate threshold or delay time exceeded. During and following test, the data is analyzed, and metrics are dynamically updated at the GUI to enable a developer to control the continuation of testing in response to ongoing observation of response behavior of the SUT.

Figure 4A:
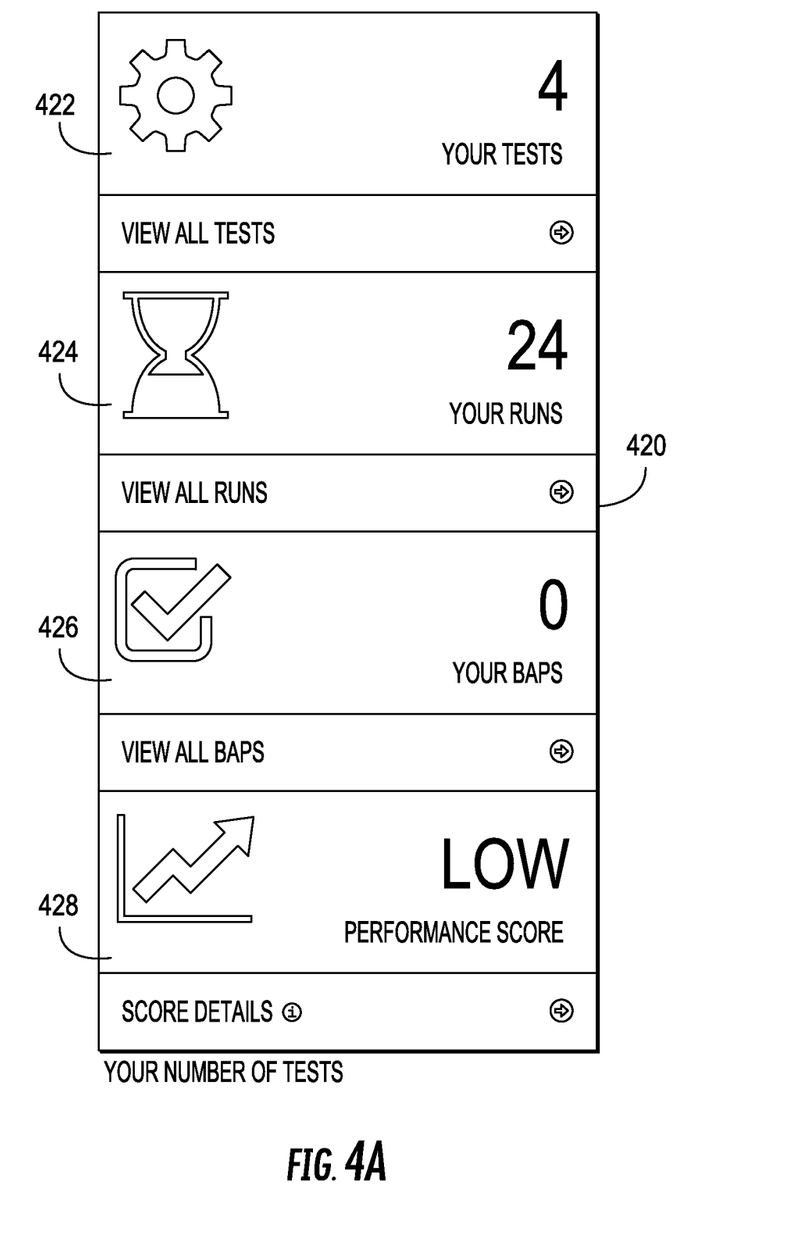
FIG. 4A and FIG. 4B illustrate windows that may be provided on a graphic user interface (GUI) for use by a developer to control the test platform of FIG. 1.

FIG. 4A illustrates a status window 420 associated with the test platform. The status window 420 is personal to a developer and provides an indication to the developer as to the status of current test runs. In FIG. 4A, test run count 422 indicates that the developer has four (4) currently executing or recently completed test runs. Icon 424 indicates the number of test executions managed by the current user and Icon 426 indicates the number of BAPs (categorization for business applications) the current user is responsible for. BAPs, in one embodiment, are an internal designation for tracking components of a software application. They usually represent an individual service or code artifact. Icon 428 provides a visual representation of the performance of the SUT at the then current point in the testing process.

Figure 4B:
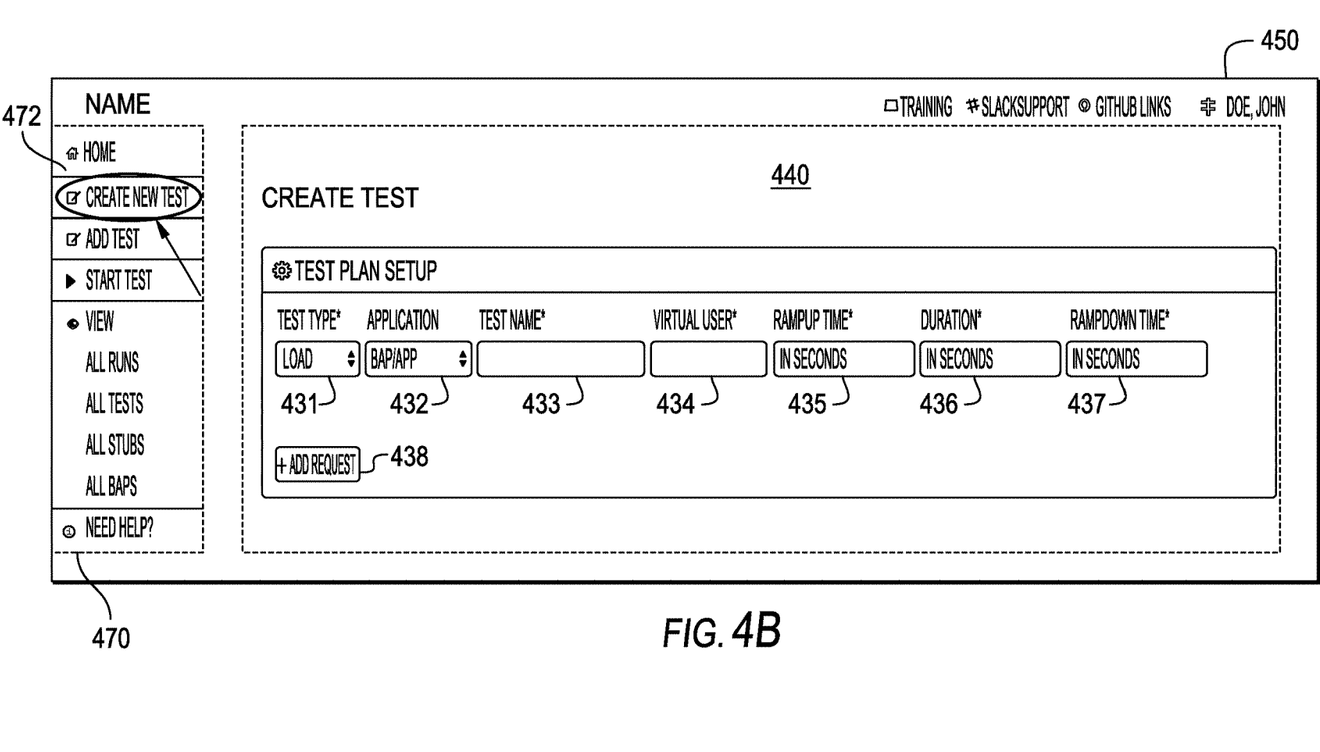

FIG. 4B illustrates an exemplary landing window 450 of a test platform GUI, including a window menu 470. Each item of the window menu 470 is associated with different aspects of the test platform, and includes a menu with selections such as 472 to allow a user to navigate between different aspects of the test platform. The illustrated menu items include a home window, a create new test window, an add test window (for adding pre-existing tests, for example developed by other developers for other SUTs), a start test window and a plurality of view windows, which vary based on the amount, extent and type of result information that is to be displayed. Although certain types of windows are shown available in the menu 470, it is understood that information may be combined in a variety of ways, and the present invention is not limited to any particular arrangement of information in the test platform GUI windows.

Selection of a window populates portion 440 of the test platform display 450. In the example of FIG. 4B, a window 440 is populated with input fields for defining a new test to be created by the developer upon selection of 'create new test' input 472. The fields include a test type field 431 (load, stress or other), an application field 432 indicating the BAP/application that is the System Under Test for this new test, a test name 433, a virtual user field 434 identifying a number of simulated users of the test, and test timing fields, including a ramp up time field 435, a duration field 436 and a ramp-down time field 437.

Once parameters of the test have been identified and the fields 431-437 populated, the developer selects button 438 to add the test to the test run.

Figure 5:
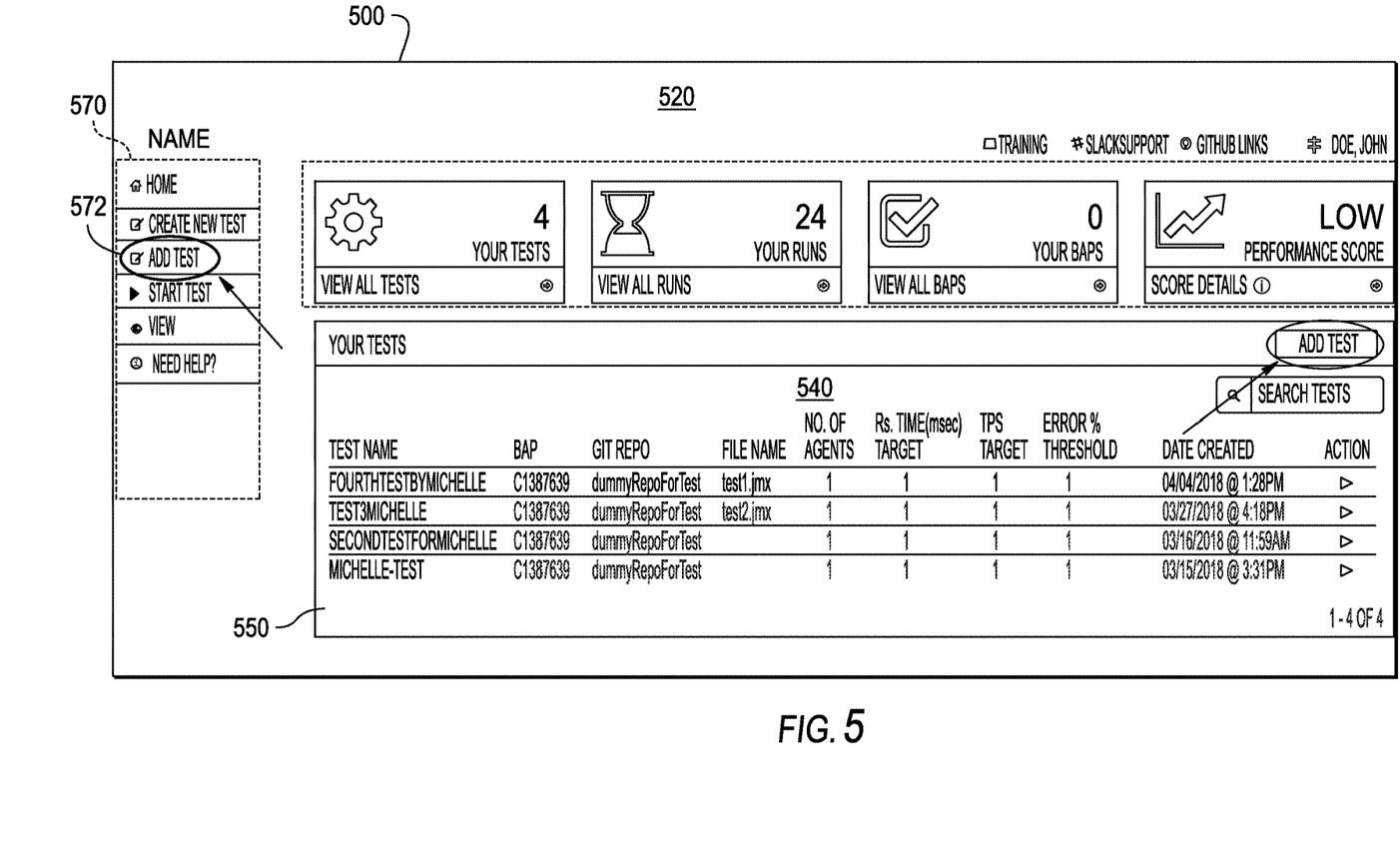
FIG. 5 illustrates a window that may be displayed by a GUI of FIG. 1 when generating tests by test platform of FIG. 1.

FIG. 5 illustrates a window 500 that may be displayed by GUI 101 in response to selection of the add test option 572 of window menu 570. Selection of option 572 results in the population of window portion 540 with a table 550 of pre-existing tests. The pre-existing tests may have been previously developed by the developer, or by other authorized developers in the enterprise, allowing previous work to be leveraged to improve the performance of the test system. Status window 520 is shown displayed as a banner within window 500.

Figure 6:
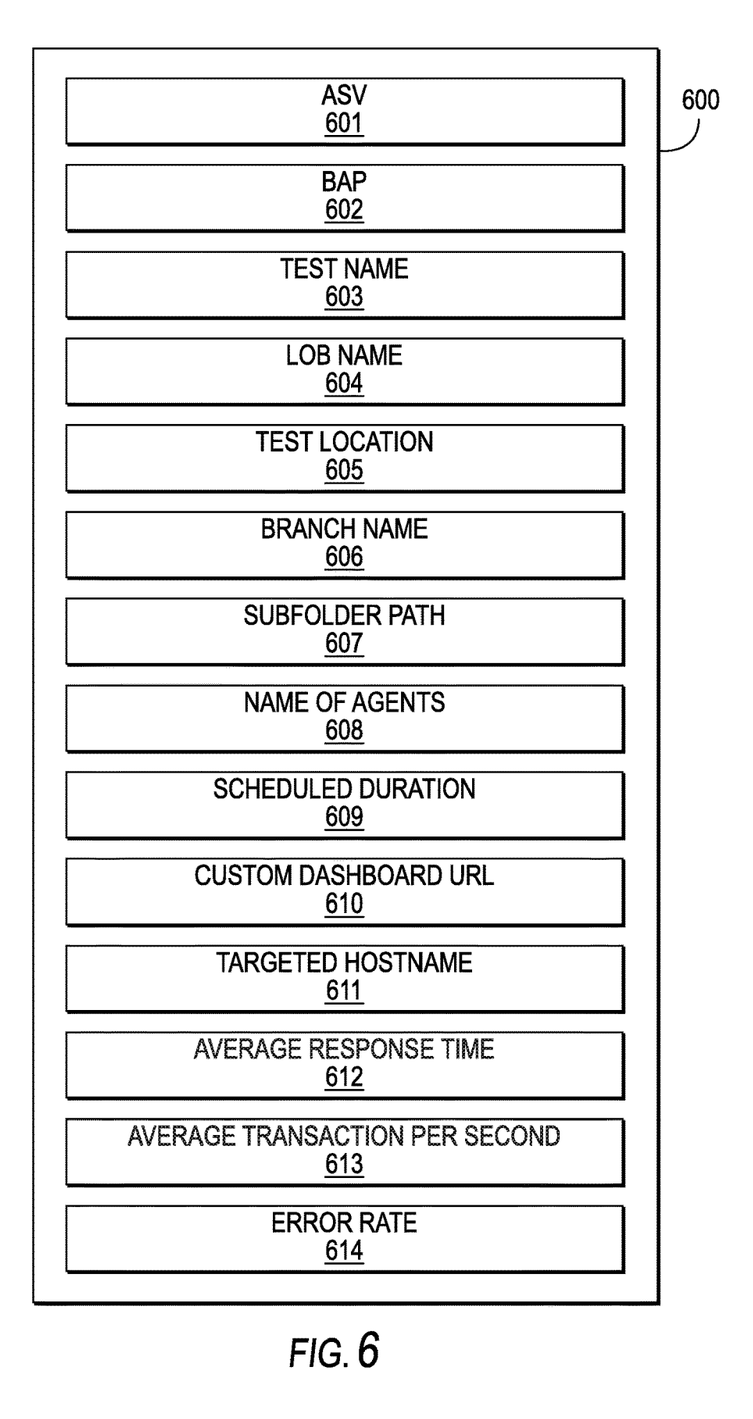
FIG. 6 illustrates an input mechanism that may be displayed by GUI of FIG. 1 to customize test runs and define performance metrics according to the invention.

Once the test run is populated either using custom tests as shown in FIG. 4B or pre-existing tests as shown in FIG. 5, the test run is ready for launch and window 600 is displayed to the developer. Window 600 includes a variety of input fields enabling the developer to define attributes of the tests including both test attribute fields and test failure criterion. These fields include ASP 601, BAP 602, a test name 603, a line of business (LOB) 604 associated with the test, the geographic location of the test 605, the branch name (or division within the enterprise), associated with the test 606, a subfolder path 607 specifying desired location of the test results, the name of agents 608 within the agent cluster of the test run, the scheduled duration 609, the web address of a custom dashboard 610 for viewing test status and results, the hostname of the SUT 611, and one or more performance metrics, such as average response time 612, average transaction rate per second 613 and desired error rate 614. The ability to customize metrics for each test run provides a significant advantage to developers with knowledge of the potential shortcomings and challenges that will be faced by a SUT in operation as it allows them to more quickly pinpoint performance issues, reducing overall performance test duration and increasing its efficacy.

Figure 7:
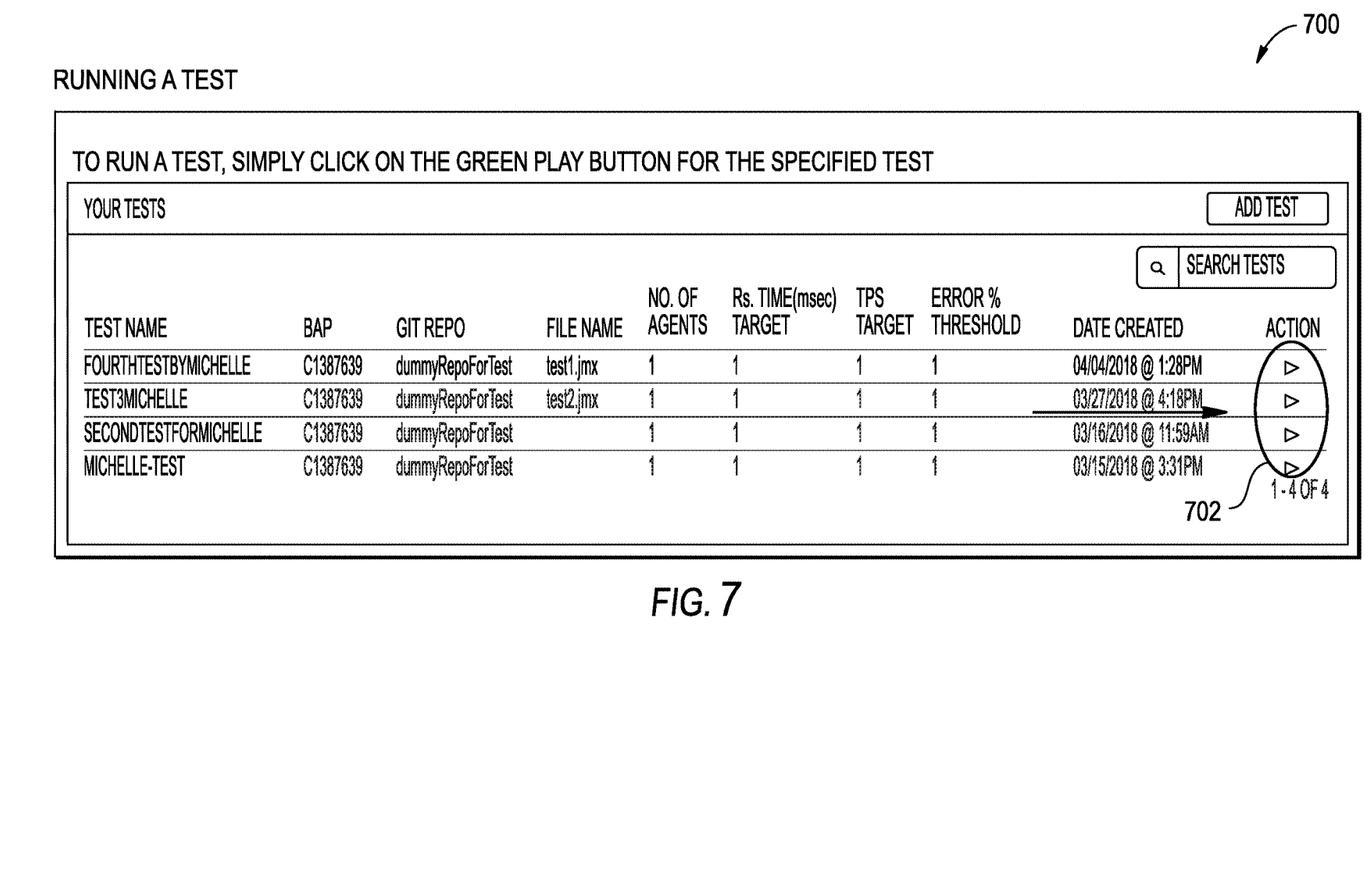
FIG. 7 illustrates a window that may be displayed by GUI of FIG. 1 for test launch.

Once all of the test run attributes have been populated as shown in FIG. 6, the test run is ready for launch. FIG. 7 illustrates a window 700 that may be displayed to a developer. Window 700 illustrates all unlaunched test runs associated with the developer. To launch a test run, the developer selects any one of the buttons indicated within circle 702.

Figure 8:
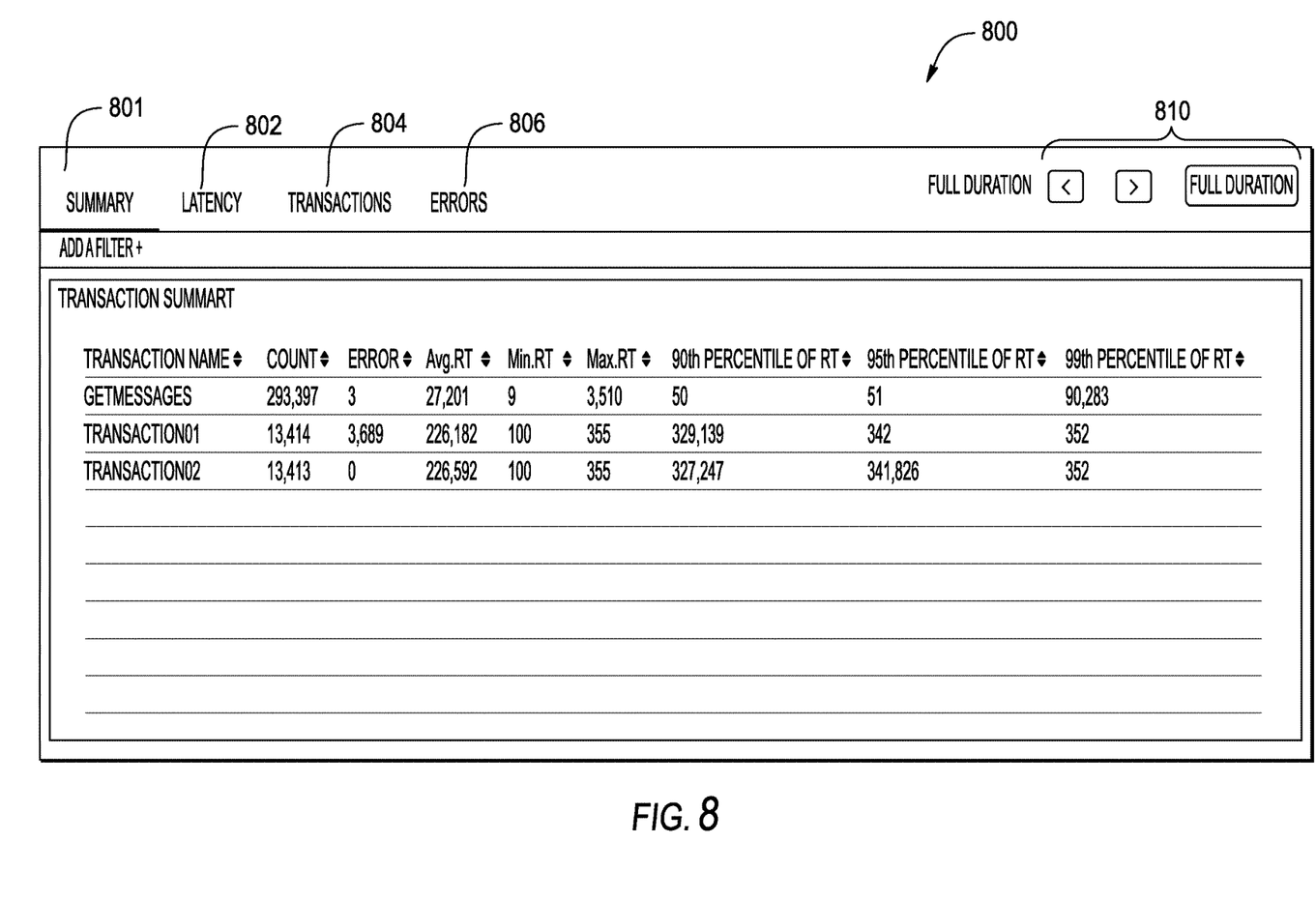
FIG. 8 illustrates an exemplary test result window that may be displayed following the execution of a test by the test platform FIG. 1.

FIG. 8 illustrates an exemplary test result window 800 that may be displayed by GUI of FIG. 1 following the execution of a test by the test platform 120. The window is shown to include a plurality of tabs including a summary tab 801 and a plurality of key performance indicator tables such as latency tab 802, transaction tab 804 and errors tab 806. As shown in window 800, the summary tab combines all of the key performance indicators into one result. Window 800 illustrates the KPI indicators for each test within the test run, giving the developer greater insight into the impact of individual tests of the test run. Buttons 810 can be used to navigate in time through the test run, displaying the key performance indicators at that point in time, to further provide the developer the opportunity to understand the impact of loads and intervening tasks upon the test run.

A test platform has been shown and described that takes advantage of a layered software architecture to provide flexible and scalable test environments which more accurately reflect the real-time network behavior for a SUT. In one aspect, a GUI enables developers to share performance tests, thereby leveraging existing work product to reduce the overall system development time. In another aspect, the test platform enables developers to customize performance goals particular to a SUT, to enable a developer to more easily identify system issues.

Some embodiments may have been described herein using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A performance test system for testing a system under test (SUT) comprising:
   a test platform to generate, execute, track or analyze a test for the SUT;
   a workstation having a processor and a graphic user interface (GUI) to receive a plurality of inputs for forwarding information to the test platform to control at least one of a selection, definition, execution, tracking or analysis of the test;
   at least one agent, deployed to a server in a pool of servers in response to the plurality of inputs received from the GUI, the at least one agent for generating first network traffic to test the SUT by executing the test;
   a storage device coupled to the test platform via a network to store second network traffic, the second network traffic comprising test results resulting from the SUT being tested with the first network traffic;
   a metrics analysis unit, coupled to the storage device via the network, for processing the stored test results to generate performance metric results for the SUT, the performance metric results customized at the GUI; and
   wherein the GUI includes a dynamically updated run window that reports at least a portion of the customized performance metric results to the test platform.

2. The performance test system of claim 1 further comprising:
   a plurality of server pools, each server pool comprising a plurality of servers, wherein the test platform associates each agent with one or more of the server pools.

3. The performance test system of claim 2 wherein the plurality of server pools are grouped according to a geographic location.

4. The performance test system of claim 2 wherein the metrics analysis unit processes the test results upon completion of the execution of the test.

5. The performance test system of claim 1, wherein the storage device stores a plurality of pre-generated tests, at least two of the plurality of pre-generated tests associated with different test platforms.

6. The performance test system of claim 5 further comprising:
   an authentication unit for limiting access to the plurality of pre-generated tests by the different test platforms.

7. The performance test system of claim 1 wherein the metric analysis unit processes the test results during the execution of the test.

8. The performance test system of claim 1 wherein the dynamically updated window is updated during the execution of the test.

9. The performance test system of claim 1 wherein the storage device comprises a plurality of storage devices that store the test results for the SUT, and wherein the GUI includes a window for displaying the test results.

10. A method for testing a System Under Test (SUT) including the steps of:
    displaying, at a workstation associated with a user, a list of a plurality of tests available to test the SUT;
    receiving at the workstation control input from the user, the control input including a selected test;
    in response to receiving the selected test, deploying an agent to operate on a pool of servers, the agent executing the selected test by generating first network traffic and providing the generated first network traffic to the SUT to populate and test an application image on at least one server of the pool;
    storing at a database second network traffic, the second network traffic comprising test results received from the execution of the selected test;
    analyzing the stored test results to generate performance metrics for the SUT;
    customizing at least one performance metric at the workstation; and
    displaying the at least one customized performance metric at the workstation.

11. The method of claim 10 further including the step of:
    automatically generating a plurality of agents in response to the control input being received at an interface of the workstation.

12. The method of claim 11 wherein the step of automatically generating a plurality of agents includes the steps of:
    copying code associated with the selected test to a plurality of application images; and
    forwarding the plurality of application images to different servers in the pool of servers.

13. The method of claim 10 wherein the servers in the pool of servers are distributed in one or more geographic regions, and wherein an agent is assigned to one of the servers in the pool in accordance with a geographic region selected by the user.

14. The method of claim 10, further including the step of:
    displaying input fields to the user to enable the user to generate a new test, the input fields including test-specific control fields and a test failure criterion.

15. The method of claim 14 wherein the test-specific control fields include at least one of a test name, a test location, a test schedule, and a test duration.

16. The method of claim 14 wherein a current value of the test failure criterion is displayed as the at least one customized performance metric at the workstation.

17. The method of claim 16 wherein the at least one customized performance metric is displayed at the workstation during the execution of the selected test.

18. The method of claim 14 wherein the test failure criterion is selected from a group including a response time, transactions per second, and an error rate threshold.

19. The method of claim 10 further including the step of: authenticating access to each test in the list of plurality of tests.

20. A method for testing a System Under Test (SUT) including the steps of:
   displaying, at a workstation, a list of a plurality of tests available to test the SUT to a user;
   receiving control input from the user, the control input including a selected test;
   in response to receiving the selected test, deploying an agent to operate on a pool of servers, the agent executing the selected test by generating first network traffic to test the SUT, wherein the servers in the pool are distributed in one or more geographic regions, and wherein the agent is assigned to one of the servers in the pool in accordance with a geographic region selected by the user;
   storing second network traffic, the second network traffic comprising test results resulting from the SUT being tested with the first network traffic;
   analyzing the stored test results to generate a performance metric for the SUT, the performance metric selected from a group including a response time, transactions per second, and an error rate threshold, wherein the performance metric is customized by the user, wherein the step of analyzing occurs while the agent is executing the selected test;
   displaying the customized performance metric at the workstation to the user; and
   selectively terminating the selected test in response to the customized performance metric satisfying or exceeding a threshold.

* * * * *